United States Patent
Martinez

(10) Patent No.: US 9,606,507 B2
(45) Date of Patent: Mar. 28, 2017

(54) METHOD FOR INTEGRATING A SYNTHETIC HOLOGRAM IN A HALFTONE IMAGE

(71) Applicant: Commissariat à l'Energie Atomique et aux Energies Alternatives, Paris (FR)

(72) Inventor: Christophe Martinez, Grenoble (FR)

(73) Assignee: Commissariat a l'energie atomique et aux energies alternatives (FR)

( * ) Notice: Subject to any disclaimer, the term of this patent is extended or adjusted under 35 U.S.C. 154(b) by 1103 days.

(21) Appl. No.: 13/687,268

(22) Filed: Nov. 28, 2012

(65) Prior Publication Data
US 2013/0135702 A1 May 30, 2013

(30) Foreign Application Priority Data
Nov. 29, 2011 (FR) ..................................... 11 60915

(51) Int. Cl.
*G03H 1/08* (2006.01)
*G03H 1/00* (2006.01)

(52) U.S. Cl.
CPC .......... *G03H 1/0841* (2013.01); *G03H 1/0011* (2013.01); *G03H 2001/0016* (2013.01);
(Continued)

(58) Field of Classification Search
CPC .......... G03H 1/08; G03H 1/18; G03H 1/0236; G03H 1/0841; G03H 1/0011;
(Continued)

(56) References Cited

U.S. PATENT DOCUMENTS

| 8,243,353 B1* | 8/2012 | Gutin | G03H 1/2286 359/21 |
| 2003/0128862 A1* | 7/2003 | Decker | B42D 25/29 382/100 |

(Continued)

FOREIGN PATENT DOCUMENTS

WO    WO 2005010684 A2 *   2/2005   ........... G06K 7/1417

OTHER PUBLICATIONS

Brown et al, Complex Spatial Filtering with Binary Masks, Applied Optics, vol. 5, No. 6, (Jun. 1966), pp. 967-969.*
(Continued)

*Primary Examiner* — Stephone B Allen
*Assistant Examiner* — Jyotsna Dabbi
(74) *Attorney, Agent, or Firm* — Kaplan Breyer Schwarz & Ottesen, LLP

(57) ABSTRACT

A method for integrating a synthetic hologram in an image of a scene, including: forming, from a first image of the scene, a first matrix including pixels of two shades according to the gray level of the corresponding pixel of the first image, and a second matrix, image of the gray level difference between the corresponding pixels of the first image and of the first matrix; forming a third matrix based on a second image; forming a fourth matrix having each pixel including a central area with a surface area determined by the corresponding element of the second matrix and off-centered in the pixel according to the corresponding pixel of the third matrix; and performing a lithography of an opaque layer at the surface of a plate according to the pattern defined by the fourth pixel matrix.

15 Claims, 9 Drawing Sheets

(52) U.S. Cl.
CPC ............... *G03H 2001/0816* (2013.01); *G03H 2001/0858* (2013.01); *G03H 2240/41* (2013.01); *G03H 2260/63* (2013.01)

(58) Field of Classification Search
CPC ...... G03H 1/2249; G03H 1/0891; G03H 1/26; G03H 1/22; G03H 2001/0016; G03H 2001/0858; G03H 2001/0816; G03H 2001/224; G03H 2001/2292; G03H 2001/2223; G03H 2001/2236; G03H 2001/0825; G03H 2001/085; G03H 2001/0022; G03H 2001/303; G03H 2240/41; G03H 2260/63; G03H 2227/06; G03H 2210/20; G03H 2210/52–2210/54; G03H 2223/13; G03H 1/0005; G03H 1/02; G06T 1/00; G06T 1/005; G06T 5/10; G06T 2207/20056; G06T 2207/20212–2207/20224; G06F 17/00; Y10T 29/49; G06K 2009/3225; G06K 9/00375; G06K 9/00771; G06K 9/6202; G02B 2027/0174; H04L 9/3247; H04L 9/3268; B42D 2035/34; B42D 25/328; B42D 25/405
USPC ................ 359/1–35; 345/418; 382/100, 232; 29/592; 380/54, 210, 252, 287; 713/176; 704/200.1, 273; 381/73.1; 348/460, 463; 235/457, 462.34; 283/86; 365/125
See application file for complete search history.

(56) References Cited

U.S. PATENT DOCUMENTS

| | | |
|---|---|---|
| 2005/0093856 A1 | 5/2005 | Borgsmuller et al. |
| 2006/0034483 A1* | 2/2006 | Au .................. G06T 1/0028 382/100 |
| 2010/0018955 A1* | 1/2010 | Martinez .......... G11B 7/0045 219/121.69 |

OTHER PUBLICATIONS

Aoki, Watermarking Technique Using Computer-Generated Holograms, Electronics and Commun., Japan, Part 3, vol. 84, No. 1, 2001, pp. 21-31.*
Rosen, et al.: "Hidden Images in Halftone Pictures," Applied Optics, vol. 40, No. 20, Jul. 10, 2001, pp. 3346-3353.
French Search Report of French Patent Application No. 1160915.

* cited by examiner

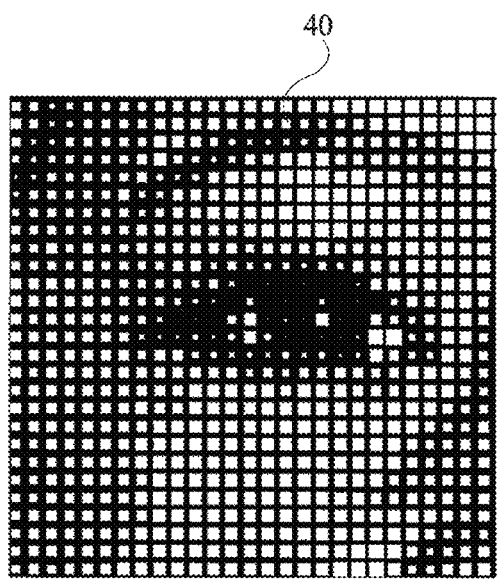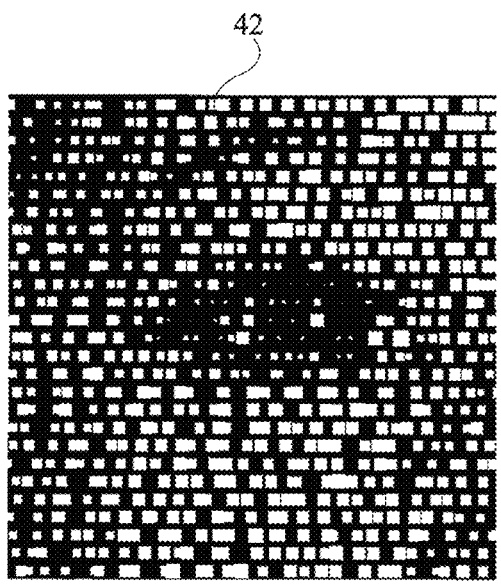
Fig 4A    Fig 4B
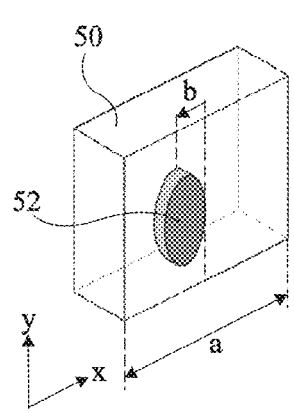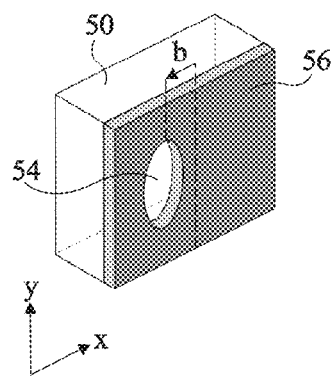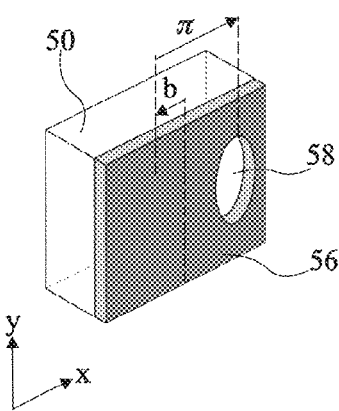
Fig 5A    Fig 5B    Fig 5C

METHOD FOR INTEGRATING A SYNTHETIC HOLOGRAM IN A HALFTONE IMAGE

BACKGROUND

The present disclosure relates to a method for integrating a synthetic hologram in a visible image. More specifically, the present disclosure relates to a method for integrating a synthetic coded-aperture hologram in a halftone image with a grayscale appearance.

DISCUSSION OF THE RELATED ART

In many fields, especially in the luxury goods industry (for example, perfumery, jewelry or leather goods), or in the field of drugs, fighting against the imitation of branded products is an everyday concern. Many methods and devices are currently used to attempt to guarantee the authenticity of branded products.

Among such techniques, it has been provided to place, on the products to be identified, transparent chips having holograms formed thereon. Such holograms are obtained from a visible image, which can be rediscovered on reading of the hologram. The presence of the hologram is difficult to detect with the naked eye and its direct reading with no adapted reading device does not enable to identify the visible source image of the hologram.

FIG. 1 is a flowchart illustrating a method for forming a hologram. FIG. 2 illustrates an example of appearance obtained by means of the hologram forming method of FIG. 1 in the case of a synthetic coded-aperture hologram.

In FIG. 1, it is started from a source image of hologram 10 (IMAGE_H), having its Fourier transform calculated at a step 12. Calculating this Fourier transform provides a Fourier transform amplitude image 14 ($A_H$) and a Fourier transform phase image 16 ($\phi_H$). Amplitude and phase images 14 and 16 are then combined in a new image which corresponds to the finished hologram (step 18, HOLOGRAM). Different combinations of amplitude and phase images 14 and 16 are possible, the idea being that illuminating the hologram with an adapted beam, combined with optics performing an inverse Fourier transform, enables to read source image 10 of the hologram (IMAGE_H).

Hologram 18 is formed of many pixels with a shape defined by the corresponding pixels of the images obtained by the calculation of Fourier transform 12. Hologram 18 thus has a resolution identical to that of initial image 10.

FIG. 2 illustrates an example of a hologram obtained by the method of FIG. 1, this hologram being a synthetic coded-aperture hologram, also called synthetic detour-phase hologram. FIG. 2 illustrates a hologram portion formed of 5×5 pixels. A reference frame (x, y) is used to identify each pixel. Each pixel 22 comprises an ellipse-shaped dark central area 24, the pixel background being light. The center of area 24 is aligned, in each pixel 22, with the pixel center along axis y.

The size of dark area 24 in each pixel depends on the result of the calculation of amplitude image 14 of Fourier transform 12 of source image IMAGE_H for the pixel of same coordinates. Areas 24 of various sizes are thus provided in the hologram.

Further, the off-centering of each area 24 in the pixel along axis x depends on the value of the pixel of same coordinates of phase image 16 ($\phi_H$).

It should be noted that different coded-aperture hologram definition methods are known. For example, the shape of areas 24 in pixels 22 may differ from the elliptic shape provided herein. It has in particular been provided to form rectangular areas 24, of variable size according to amplitude image 14, and more or less off-centered in the pixel according to phase image 16 (along axis x).

FIG. 3 illustrates a device for reading a synthetic hologram such as that in FIG. 2, obtained by a method such as that in FIG. 1. In FIG. 3, the read device is a reflection device. It should be noted that there similar transmission read devices. A light beam 30 is transmitted, for example by a beam splitter cube 32, towards a hologram 34 (not shown in detail) formed on a chip 36. The pixels of hologram 34 reflect the light beam.

The beam reflected by the hologram crosses back beam splitter cube 32 and is then combined by a lens 38 having the function of applying an inverse Fourier transform to the received beams to display an image on a display device (not shown) placed at the focal point of the lens.

It should be noted that if a phase-key encryption of the hologram is provided on forming of the hologram, a wave plate similar to the phase key should be placed in the read device of FIG. 3 to read the hologram.

Techniques for integrating holograms in an image have been provided. Joseph Rosen and Bahram Javidi's publication entitled "Hidden images in halftone pictures", Appl. Opt. 40, No. 20, 3346-3353, discloses such a technique.

FIGS. 4A and 4B respectively illustrate a first image 40 having a grayscale appearance and a second image 42, resulting from the first image, having a synthetic coded-aperture hologram integrated therein. The second image is obtained by the method described in the above publication.

FIG. 4A is an image obtained by half toning of a grayscale image. The half toning method, currently used, for example, in printing processes, comprises associating with each shade of an initial grayscale pixel a pixel comprising a white central area on a black background (or the reverse), the central area being of variable size according to the shade of the equivalent pixel of the grayscale image. Visually, moving away from the image, the halftone image and the grayscale image seem to be identical.

It should be noted that half toning techniques are generally carried out with a sufficiently high resolution for the halftone not to appear to the naked eye.

Image 42 of FIG. 4B is obtained from image 40 of FIG. 4A and integrates a synthetic hologram. In image 42, the hologram is integrated by modifying the size and the alignment of the central areas of the different pixels, according to the hologram to be integrated.

A reading of the image of FIG. 4B, for example, by means of the device of FIG. 3, for example associated with a filter, provides the source image used to form the hologram.

Disadvantages of the above-mentioned technique appear in FIG. 4B: indeed, it can be seen in this drawing that certain off-centered light areas are superimposed to other light areas of neighboring pixels. Such a superimposition implies a significant loss of information, which is not desirable.

This integration thus negatively affects the reading of the coded hologram. Further, the above technique implies a poor grayscale contrast and significant phase coding constraints.

SUMMARY

An embodiment provides a method overcoming all or part of the disadvantages of prior art techniques of integration of holograms in images.

More specifically, an embodiment provides a method enabling to integrate a hologram in a grayscale image with a good quality for the direct reading thereof.

Thus, an embodiment provides a method for integrating a synthetic hologram in a directly observable image of a scene, comprising the steps of: defining a first image of the scene, comprising grayscale pixels; forming first and second matrixes based on the first image, the first matrix comprising pixels of a first and of a second shade according to whether the corresponding pixel of the first image has a gray level greater than or smaller than a threshold, each element of the second matrix comprising a value equal to the gray level difference between the corresponding pixel of the first image and the corresponding pixel of the first matrix; forming a third pixel matrix by calculating the phase image of the Fourier transform of an image originating from a second source image of the hologram; forming a fourth pixel matrix, each pixel of the fourth matrix comprising a central area having its surface area determined based on the corresponding element of the second matrix and off-centered in the pixel according to the corresponding pixel of the third matrix; and performing a lithography of an opaque layer at the surface of a plate according to the pattern defined by the fourth pixel matrix, the lithography being provided to remove, from a pixel, the opaque layer inside of the central area if the equivalent pixel of the first matrix is of the first shade and to remove the opaque layer outside of the central area if the equivalent pixel of the first matrix is of the second shade.

According to an embodiment, the size of the central area of each of the pixels of the fourth matrix is calculated from the value of the corresponding pixel of a fifth pixel matrix, each pixel of the fifth matrix being obtained by calculation of the diffracted amplitude of an aperture defined in a pixel, the ratio of the aperture surface area to the pixel surface area being equal to the value of the corresponding element of the second matrix.

According to an embodiment, amplitude $A^h_{nm}$ of a pixel of the fifth matrix (IMAGE_$G_A$) depends on value $I_{nm}$ of the corresponding element of the second matrix according to the following relation:

$$A^h_{nm} = \sqrt{\frac{I_{nm}}{2}} \cdot J_1\left(\sqrt{8 I_{nm}}\right)$$

$J_1$ being the first Bessel function.

According to an embodiment, the third matrix is obtained by carrying out the steps of: (a) calculating a sixth amplitude matrix obtained from the second source image of the hologram by carrying out the same steps as those enabling to obtain the fifth matrix from the second matrix; (b) combining the pixels of the sixth amplitude matrix with a random phase distribution or with a continuous component to obtain a complex value; and (c) calculating the phase image of the Fourier transform of the complex value.

According to an embodiment, the third matrix is obtained by an optimization method taking advantage of the fifth matrix.

According to an embodiment, the optimization method comprises the steps of: (a) calculating a sixth amplitude matrix obtained from the second source image of the hologram by carrying out the same steps as those enabling to obtain the fifth matrix from the second matrix; (b) combining the pixels of the sixth amplitude matrix with a random phase distribution or with a continuous component to obtain a first complex value; (c) calculating the Fourier transform of the first complex value; (d) combining the pixels of the fifth pixel matrix with the pixels of the phase image resulting from the Fourier transform of step (c) to obtain a second complex value; (e) calculating the inverse Fourier transform of the second complex value; (f) combining the pixels of the sixth amplitude matrix with the pixels of the phase image resulting from the calculation of step (e) to obtain a new first complex value; (g) repeating step (c) to calculate the Fourier transform of the new first complex value, the third matrix corresponding to the obtained phase image of this last Fourier transform.

According to an embodiment, the optimization method further comprises the repeating of steps (d) to (g), the third matrix corresponding to the phase image obtained at step (g) after several cycles of repeating of steps (d) to (g).

According to an embodiment, at least three cycles are carried out.

According to an embodiment, the off-centering of the central area in each pixel of the fourth matrix is directly proportional to the value of the corresponding pixel of the third matrix.

According to an embodiment, the gray level threshold is equal to 0.5, to within 10%, on a normalized grayscale.

According to an embodiment, the central area of each pixel of the fourth matrix is elliptic.

According to an embodiment, the aspect ratio of the elliptic central region of each pixel of the fourth matrix is equal to π/2.

According to an embodiment, the first shade of the first matrix is a minimum shade, the second shade of the first matrix is a maximum shade, the lithography being provided to remove the opaque layer inside of the central area of a pixel if the equivalent pixel of the first matrix has the first shade and to remove the opaque layer outside of the central area of a pixel if the equivalent pixel of the first matrix has the second shade.

According to an embodiment, a minimum size of the central area of the pixels of the fourth matrix is imposed.

According to an embodiment, the minimum size of the central area of the pixels of the fourth matrix corresponds to a gray level of 0.02 for dark pixel hues and of 0.98 for light pixel hues, on a normalized grayscale.

The foregoing and other features and benefits will be discussed in detail in the following non-limiting description of specific embodiments in connection with the accompanying drawings.

BRIEF DESCRIPTION OF THE DRAWINGS

FIGS. 4A and 4B, previously described, respectively illustrate a halftone image and an image originating from the image of FIG. 4A having a hologram integrated therein;

FIGS. 5A to 5C illustrate a technique for forming coded-aperture pixels equivalent in terms of diffraction;

For clarity, the same elements have been designated with the same reference numerals in the different drawings.

DETAILED DESCRIPTION

Figure 1:
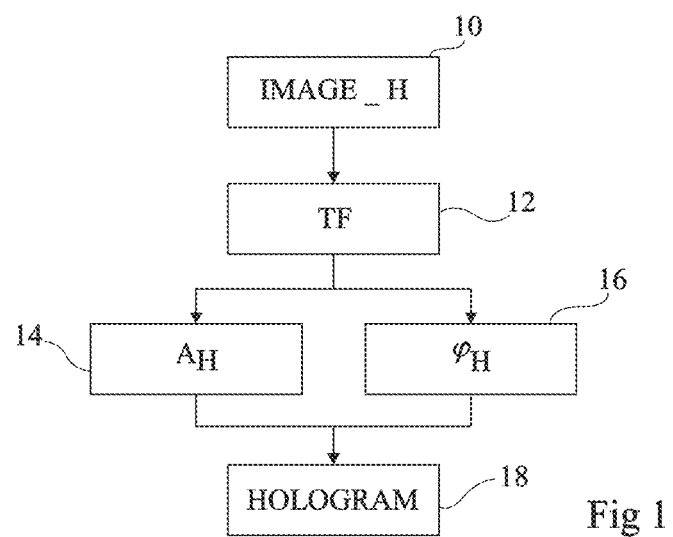
FIG. 1, previously described, in a flowchart illustrating a known synthetic coded-aperture hologram forming method.
Figure 2:
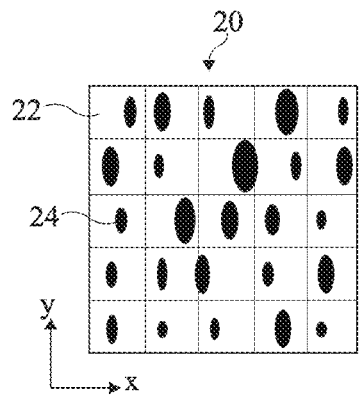
FIG. 2 illustrates an example of result obtained by means of the method of FIG. 1.

FIGS. 5A to 5C illustrate an equivalence property of pixels of a synthetic coded-aperture hologram, which will be used to integrate a hologram in a grayscale image.

These three drawings show, in three dimensions, a portion of a transparent wafer 50 having its surface defining a pixel of a synthetic coded-aperture hologram. The shown pixel has a width "a".

In the example of FIG. 5A, the considered pixel comprises an opaque central area 52, of elliptic shape, on a transparent background. In practice, the opaque area may be formed on wafer 50 by depositing, over this entire wafer 50, an opaque layer (absorbing or reflective), for example, made of platinum oxide ($PtO_x$), which is for example etched by lithography to define central area 52.

In the example shown in FIG. 5A, the center of opaque area 52 is off-centered to the left in the pixel by a distance b (along axis x). As seen previously, off-centering b depends on the corresponding pixel of the phase image of the Fourier transform of the source image of the hologram. The size of opaque area 52 is an image of the corresponding pixel of the amplitude image of the Fourier transform of the source image of the hologram.

The elliptic shape provided herein has the advantage of being relatively smooth for the eye when used to form pixels of an image obtained by half toning of a grayscale image. In particular, this shape is much more pleasant to the eye than the rectangular shapes of FIGS. 4A and 4B.

FIG. 5B illustrates a pixel complementary to the pixel of FIG. 5A. In this pixel, the opaque and transparent regions of the pixel are reversed with respect to the pixel of FIG. 5A, that is, area 54, of same surface area as area 52 of FIG. 5A, is transparent and the rest of the pixel surface is covered with an opaque portion 56.

The pixel of FIG. 5C is obtained from the pixel of FIG. 5B and comprises an opaque background 56 having a transparent area 58 defined therein. Transparent area 58 is of same size as area 54. Area 58 is off-centered to the right with respect to transparent area 54, along axis x, so that the equivalent phase shift between areas 54 and 58 is a π phase shift (in relation with the phase image of the hologram). In practice, such a phase shift may be obtained by offsetting area 58 with respect to area 54 by a distance equal to a/2.

According to Babinet's principle of complementary screens, the pixel of FIG. 5A is equivalent, in terms of implied diffraction pattern when it is illuminated, to the complementary phase-shifted pixel of FIG. 5C. Given this property, the idea is to provide a method for integrating a hologram in a halftone image having a grayscale appearance, where the darkest cells of the grayscale image, rather than being formed of an opaque central area of larger size on a transparent background, are formed of a transparent central area of small size on an opaque background (which is equivalent). The central area is then phase-shifted to integrate the hologram, as will be seen hereafter.

Figure 6:
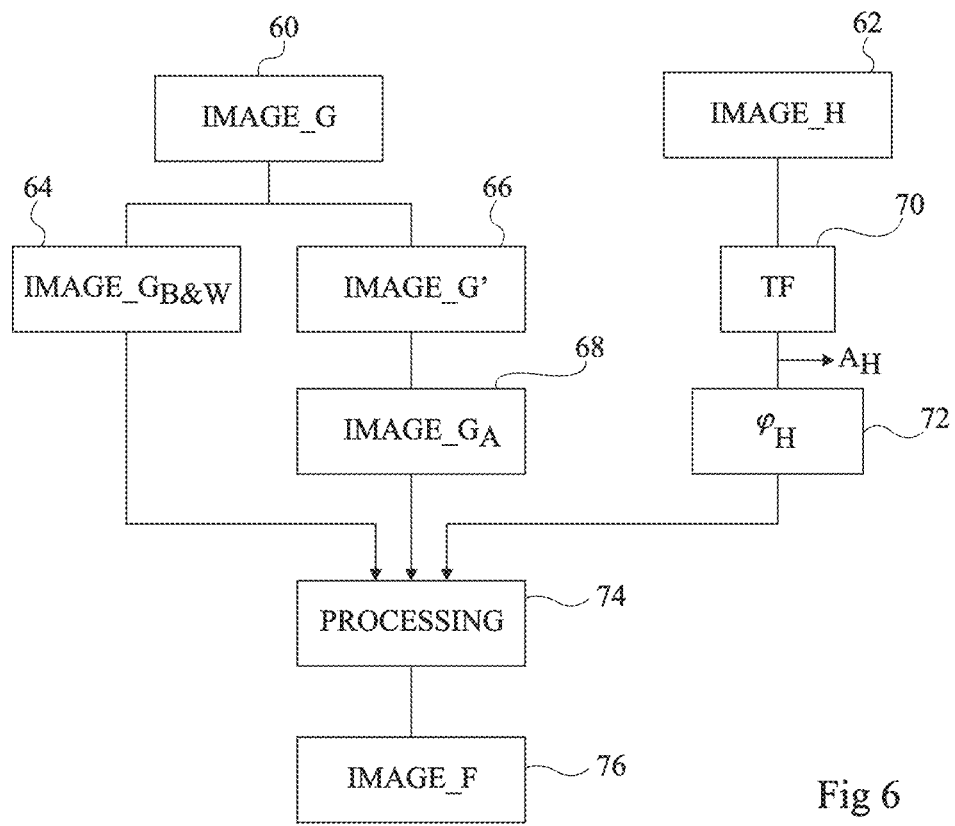
FIG. 6 is a flowchart illustrating a method according to an embodiment.

FIG. 6 is a flowchart of a method provided to integrate a hologram in a visible image.

Initial steps 60 and 62 of the method comprise selecting, on the one hand, a real grayscale image of a scene, IMAGE_G, which is desired to be seen with the naked eye once the hologram has been integrated in the image, and on the order hand, a source image of the hologram, IMAGE_H, which is desired to be integrated in the form of a synthetic coded-aperture hologram in a final visible image (IMAGE_F).

Based on grayscale image 60 (IMAGE_G), a first black-and-white image matrix (IMAGE_$G_{B\&W}$) 64 is determined, this image comprising pixels of a first shade, for example, black, at the level of the pixels of image 60 having a gray level smaller than a threshold α (dark pixels) and pixels of a second shade, for example, white, for the pixels of image 60 having a gray level higher than threshold α (light pixels). It should be noted that the reverse is also possible, the idea being to distinguish the pixels of image 60 having a gray level lower or higher than threshold α.

Starting from image 60, processing and calculation means are used to determine a matrix IMAGE_G', 66, having a size identical to the resolution of image 60, IMAGE_G, where each element of the matrix contains a value proportional to the difference between the gray level of the corresponding pixel of image 60 and the gray level of the corresponding pixel of image 64 (IMAGE_$G_{B\&W}$). The link between images 60 and 64 and matrix 66 will be described in further detail hereafter in relation with FIG. 8. The values stored in matrix 66 are thus increasing, up to a threshold, along with the gray level of the corresponding pixels of initial image 60, and then decreasing when the gray level of the corresponding pixels of image 60 increases above the threshold (the opposite is also possible).

In practice, the detection threshold of matrix 66 is the same threshold as detection threshold α of image 64. It is preferably selected at a midscale gray level of image 60, for example, at 0.5 to within 10%, and is preferably equal to 0.5, on a normalized grayscale.

A next step 68 comprises obtaining, from matrix 66 (IMAGE_G'), an image matrix IMAGE_$G_A$ 68 of the amplitude of the holographic raster. The determination of the pixels of image 68 will be described in further detail hereinafter, in relation with FIGS. 9 and 10.

In parallel, a step 70 comprises calculating the Fourier transform of an image originating from the source image of the hologram, 62 (IMAGE_H). More specifically, the Fourier transform of an amplitude image, IMAGE_$H_A$, obtained from source image IMAGE_H, is calculated in a way similar to that in which image 68, IMAGE_$G_A$, has been calculated from image 66, IMAGE_G', as will be described in further detail hereinafter. The Fourier transform calculated at step 70 provides an amplitude image $A_H$ and a phase image 72 ($\phi_H$). Amplitude image $A_H$ is not used.

To improve the quality of the hologram, a random phase distribution may be added to amplitude image IMAGE_$H_A$ before the Fourier transform calculation. This phase scrambling method is known by those skilled in the art.

A step 74, implemented by calculation and processing means, comprises combining phase image $\phi_H$ resulting from Fourier transform 70, black-and-white image 64 (IMAGE_$G_{B\&W}$) and amplitude image 68 (IMAGE_$G_A$) to obtain a final image 76 (IMAGE_F) having an appearance identical to the appearance of image 60 (IMAGE_G) and which integrates a hologram obtained from the source image of hologram 62 (IMAGE_H).

To achieve this, each pixel of final image 76 comprises a central area surrounded with a background, defined as follows:
- if the pixel of same coordinates in image 64 (IMAGE_$G_{B\&W}$) has a first shade, for example, black, the central area is transparent and the background is opaque, and if the pixel of same coordinates of image 64 (IMAGE_$G_{B\&W}$) has a second shade, for example, white, the central area is opaque and the background is transparent;
- the size of the central area in each pixel is calculated from the gray level of the pixel of same coordinates of image 68 (IMAGE_$G_A$);
- if the pixel of same coordinates of phase image $\phi_H$ of the Fourier transform of image 62 is dark (phase values tending towards $-\pi$), the central area in the pixel of same coordinates of final image 76 is strongly off-centered towards one side of the pixel, if the pixel of same coordinates of the phase image of Fourier transform 72 $\phi_H$ of image 62 is light (phase tending towards $+\pi$), the central area is off-centered in the pixel of same coordinates of image 76 towards an opposite side of the pixel, and if the pixel of same coordinates of phase image 72 has a medium shade, the central area of the pixel of same coordinates of final image 76 is centered in the pixel (the off-centering of the central area in the pixel is proportional to the value of the equivalent pixel of image $\phi_H$).

Once final image IMAGE_F has been obtained, a lithography of an opaque layer defined at the surface of a plate according to the pattern of this image is performed.

Figure 7:
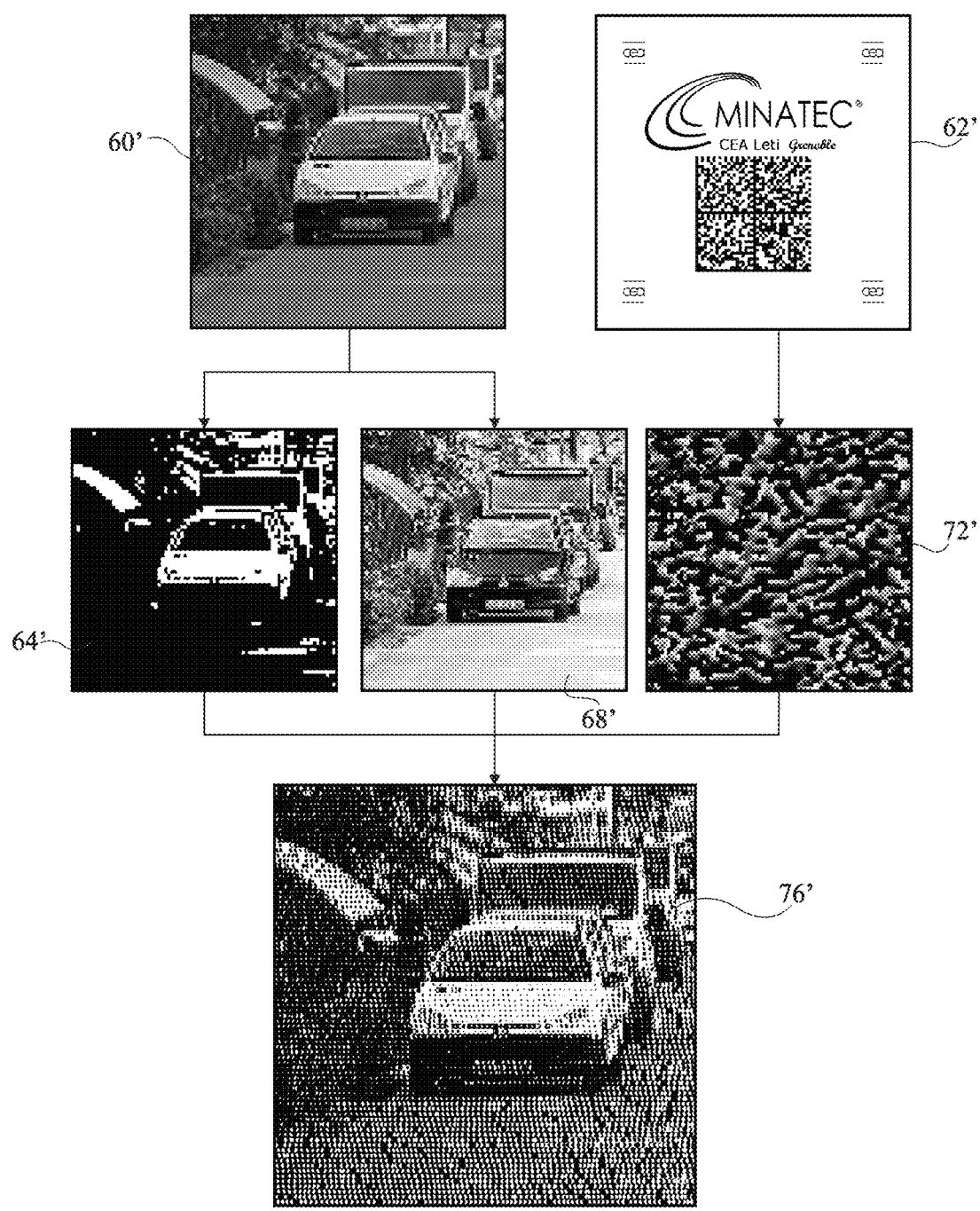
FIG. 7 illustrates results of steps of the method of FIG. 6.

FIG. 7 illustrates steps of the flowchart of FIG. 6 by an example of images obtained by these steps. In this drawing, the images obtained at the different steps are designated with the reference of the corresponding step, followed by a'. In this drawing, the halftone screen of the obtained images is visible for a better understanding.

Figure 8:
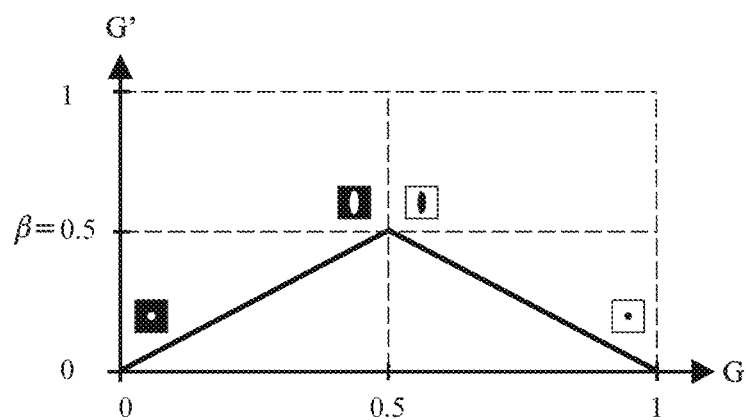
FIG. 8 illustrates a curve of the value of elements of a matrix originating from an initial grayscale image obtained according to a step of an embodiment.

FIG. 8 illustrates the principle of forming of the elements of the matrix (IMAGE_G') from image 60 (IMAGE_G). Matrix 66 is formed of elements having a value defined according to the difference, in absolute value, between the gray level of the corresponding pixel of image 60 and the gray level of the corresponding pixel of image 64 (IMAGE_$G_{B\&W}$). More specifically, this drawing illustrates a curve of value G' of an element of matrix 66 (IMAGE_G'), according to gray level G of the equivalent pixel of image 60 (IMAGE_G).

In this curve, it can be seen that for a pixel of image IMAGE_G having a gray level G ranging between 0 and 0.5 (black pixel to medium-grey pixel), the value of G' of an element of matrix 66 increases up to a value β.

If gray level G of a pixel of the grayscale image, IMAGE_G, ranges between 0.5 and 1 (medium-gray pixel to white pixel), the value of the equivalent element of matrix IMAGE_G' decreases between threshold β and a zero value when the pixel is very light.

To provide an optimal coding of the holograms, a minimum threshold of the value of the elements of matrix IMAGE_G' may be provided for totally black or totally white pixels of image IMAGE_G 60 (respectively G=0 or G=1). This enables to optimize the appearance of the final reading of the hologram, as will be seen hereafter. The minimum threshold will typically be 2% of the maximum or minimum gray levels (the minimum size of the central area of the pixels corresponding to a gray level of 0.02 for dark pixel shades and of 0.98 for light pixel shades, on a normalized grayscale).

Matrix 66 (IMAGE_G') is used to obtain an amplitude image IMAGE_$G_A$ (68) of the wave associated with the hologram, which is used to determine the size of the central areas of the pixels of the final image (IMAGE_F).

It should be noted that, with an elliptic shape of the central area, the ellipse shape may be optimized so that the ellipse has a maximum size, in direction y, equal to the pixel side with a pixel filling rate equal to 50%. Simple geometric calculations provide the fact that an ellipse having a ratio of its large side to its small side equal to $\pi/2$ enables to obtain a pixel filling rate equal to 50% for one dimension of the ellipse, along direction y, equal to the pixel width. This ratio further provides a very smooth visual appearance.

The obtaining of amplitude image 68 requires considering the equations of diffraction of a planar wave through an aperture.

Figure 9:
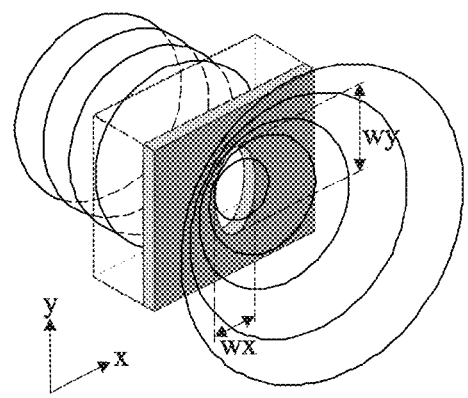
FIG. 9 is a perspective view of a pixel of a hologram according to an embodiment.

FIG. 9 illustrates, in three dimensions, a pixel comprising a transparent central area surrounded with an opaque background. The central area has dimensions called wy in direction y and wx in direction x.

When a planar wave is incident on the aperture of FIG. 9, or more generally a diffraction pattern of coordinates (n, m) of a synthetic coded-aperture hologram such as provided hereabove, a pattern of dimensions $wx_{nm}$ and $wy_{nm}$ generates a spherical diffracted wave of amplitude $A^h_{nm}$ depending on the aperture parameters by the following non-linear relation:

$$A^h_{nm} = \frac{wy_{nm}}{2} J_1(\pi \cdot wx_{nm}), \qquad (1)$$

$J_1$ being the first Bessel function. It should be noted that for an optimal coding of the phase, an elliptic shape of the aperture such that wy>wx is considered.

In a grayscale image, the surface of the dark central portion of a pixel normalized with respect to the pixel surface sets the hue perceived by the observer. Hue $I_{nm}$ depends on the pixel shape by relation:

$$I_{nm} = \frac{\pi \cdot wx_{nm} \cdot wy_{nm}}{4} \qquad (2)$$

To obtain the amplitude image of initial image 60 (IMAGE_G), equation (1) is directly applied to apertures having their surface area defined so that ratio $I_{nm}$ of the aperture surface area to the pixel surface area corresponds to the value of the corresponding element of matrix 66 (IMAGE_G'). To provide a good definition of amplitude image IMAGE_$G_A$ 68, threshold β may be set to 0.5 (the surface area of the aperture corresponding to half the pixel surface area). A relation enabling to calculate the dimensions of the central areas of the pixels of image IMAGE_F is thus obtained.

In practice, an aspect ratio of the aperture ρ=wy/wx is defined and wy is limited to a maximum value equal to 1 (normalized pixel side). The two above equations provide a relation between the value of the corresponding element $I_{nm}$ of matrix IMAGE_G' and the amplitude of the wave diffracted by this pixel ($A^h_{nm}$), according to ρ, which is as follows:

$$A^h_{nm} = \sqrt{\frac{\rho I_{nm}}{\pi}} \cdot J_1\left(2\sqrt{\frac{\pi I_{nm}}{\rho}}\right) \quad (3)$$

The above equation thus enables to link the elements of matrix IMAGE_G', and thus the gray level of the corresponding pixel of initial image IMAGE_G, to the amplitude of the pixel of same coordinates of image IMAGE_$G_A$, that is, to the size of the central area of the pixels of final image IMAGE_F.

Figure 10:
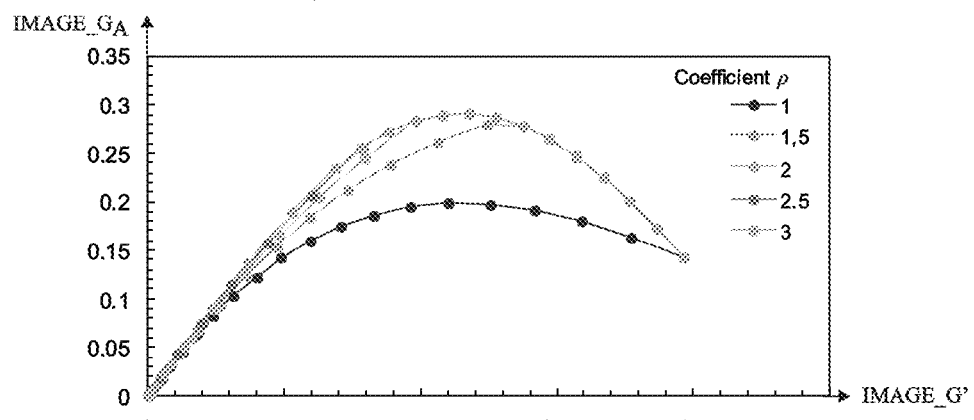
FIG. 10 is a curve of the amplitude of the holographic raster according to the gray level of a halftone pixel.

FIG. 10 provides a representation of this transfer function for different values of ρ. It should be noted that the selection of an elliptic pattern limits the range of intensity values to wx=1 and wy=1, that is, a maximum intensity of 0.8 in the pixel.

Beyond this value, the pattern goes over the cell limits and the quality of the phase coding decreases. In the case of the above method, intensity $I_{nm}$ is limited to threshold α predefined by the curve of FIG. 8, that is, to 0.5. To optimize the amplitude of the selected wave while keeping a quasi-circular pattern shape, ρ=π/2 is preferentially selected, as seen hereabove. In this case, equation (3) simplifies as:

$$A^h_{nm} = \sqrt{\frac{I_{nm}}{2}} \cdot J_1(\sqrt{8I_{nm}}) \quad (4)$$

It should be noted that, to simplify the programming of this transfer function, the Bessel function may be replaced with its series expansion with a good accuracy, which provides the following equation:

$$A^h_{nm} = (I_{nm}) - (I_{nm})^2 + \frac{1}{3}(I_{nm})^3 \quad (5)$$

Thus, the pixels of the final image obtained by the method of FIG. 6 have a halftone structure with a central area having a holographic raster amplitude defined by the above equation based on the element of same coordinates of matrix IMAGE_G'.

The method of FIG. 6 advantageously enables to obtain an image having an aspect identical to that of grayscale image IMAGE_G, hiding a synthetic coded-aperture hologram, capable of being read directly. This method is however not optimal due to the fact that amplitude image $A_H$ of the Fourier transform of hologram IMAGE_H has been suppressed and replaced with amplitude image IMAGE_$G_A$. The quality of the reconstruction of image IMAGE_H is thus decreased, as will be seen hereafter.

It should be noted that amplitude image IMAGE_$H_A$ having its Fourier transform calculated at step 70 of FIG. 6 is obtained from source image IMAGE_H 62 by the same method as that for obtaining image 68 (IMAGE_$G_A$) from matrix 66 (IMAGE_G'), that is, by calculating the amplitude diffracted by apertures having a size depending on the gray level of the equivalent pixel of source image IMAGE_H.

Figure 11:
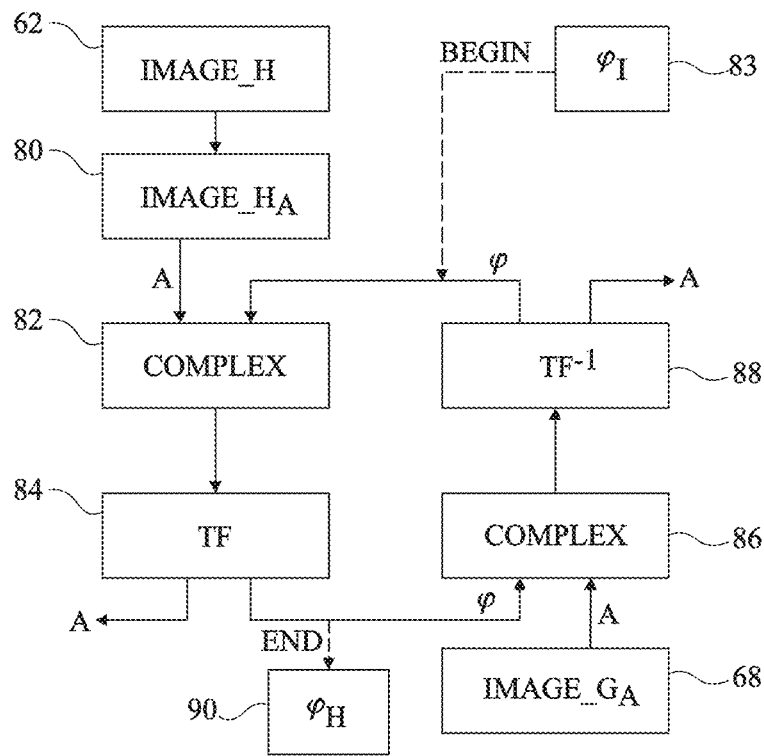
FIG. 11 is a flowchart illustrating a method according to a variation of an embodiment.

FIG. 11 illustrates an optimization method providing a phase image $\phi_H$ resulting from the Fourier transform of amplitude image IMAGE_$H_A$ and of amplitude image IMAGE_$G_A$, enabling to overcome the quality loss at the reading phase of the above-described method.

The method for optimizing the phase image imposed to the final image provided herein is an iterative optimization method described in Gerchberg and Saxton's publication entitled "A pratical algorithm for the determination of the phase from image and diffraction plane pictures", Optik, Vol. 35, 237-246.

Starting from the source image of the hologram, IMAGE_H (62), the amplitude image of this image, IMAGE_$H_A$ (80), is determined in a way similar to that in which the amplitude of holographic raster IMAGE_$G_A$ resulting from matrix IMAGE_G' (66) has been determined.

At a next step 82, amplitude image IMAGE_$H_A$ 80 is combined with an initialization phase component $\phi_I$ 83 resulting either from a random phase distribution of phase scrambling type, or from a continuous phase component, to obtain a complex value (process initialization). The Fourier transform of the complex image obtained at step 82 is then calculated at a step 84.

Amplitude image A obtained by the Fourier transform of step 84 is left aside (just as amplitude image $A_H$ in FIG. 6). At a step 86, a complex value is calculated by combination of amplitude image IMAGE_$G_A$, 68, obtained from gray level image 60 and phase image ϕ obtained at step 84.

At a step 88, the inverse Fourier transform of the complex value obtained at step 86 is calculated. Amplitude image A of the obtained result is left aside. Phase image ϕ obtained by this inverse Fourier transform is introduced at the input of step 82 instead of the initialization phase distribution of process $\phi_I$, in combination with amplitude image IMAGE_$H_A$. Step 84 of calculation of the Fourier transform of the complex value obtained at step 82 is repeated to obtain an optimized phase image $\phi_H$ (step 90), due to the taking into account of image 68, IMAGE_$G_A$. Cycle of steps 82 to 88 may be repeated several times to optimize the phase image $\phi_H$ obtained at step 90.

The phase image obtained at step 90 may be used directly in the method of FIG. 6 by replacing phase image 72. Indeed, due to the carrying out of the above-described cycle, phase image $\phi_H$ not only integrates data originating from the source image of the hologram, IMAGE_H, but also a corrective element which enables to counteract the fact that the size of the central areas of the pixels of the obtained final image, IMAGE_F, does not depend on the source image of the hologram but on the gray levels of visible grayscale image IMAGE_G.

Carrying out the above cycle of improvement of phase image $\phi_H$ enables to improve the reading of the hologram integrated in the halftone image. It should be noted that the above cycle may be repeated as often as necessary so that the final phase image $\phi_H$ of step 90 comprises an efficient corrective of the loss of information due to the lack of use of the amplitude image of the Fourier transform of the source image of the hologram.

After a number of iterations, which number may vary as will be seen hereafter, an optimized phase image $\phi_H$ which is used in the method of FIG. 6 is obtained.

Figure 3:
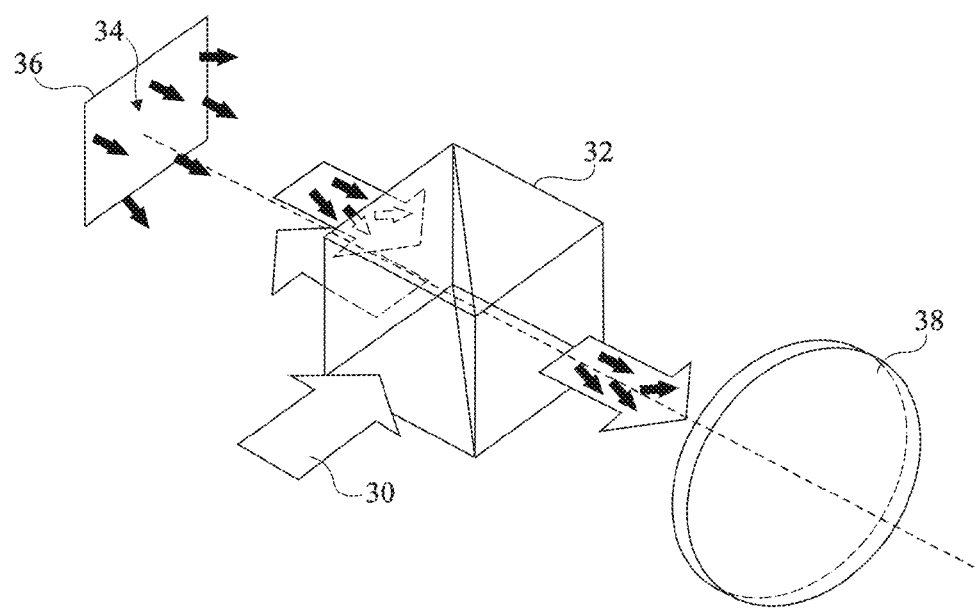
FIG. 3 illustrates a device for reading a hologram such as that in FIG. 2, for example obtained by a method such as that in FIG. 1.
Figure 12A:
FIGS. 12A to 12D illustrate reading results obtained from holograms integrated in visible images formed by the method of FIGS. 6 and 11, according to the number of iterations of this method.
Figure 12B:
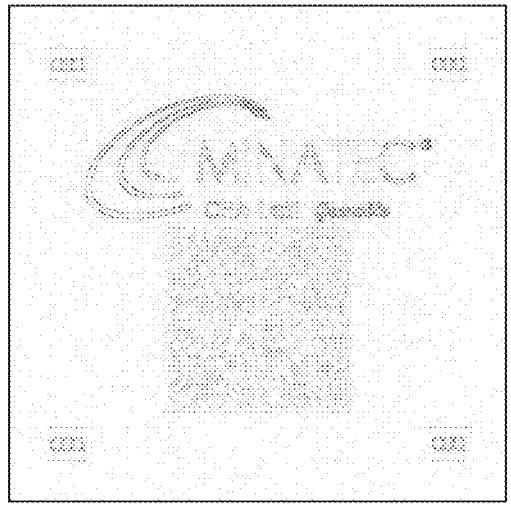
Figure 12C:
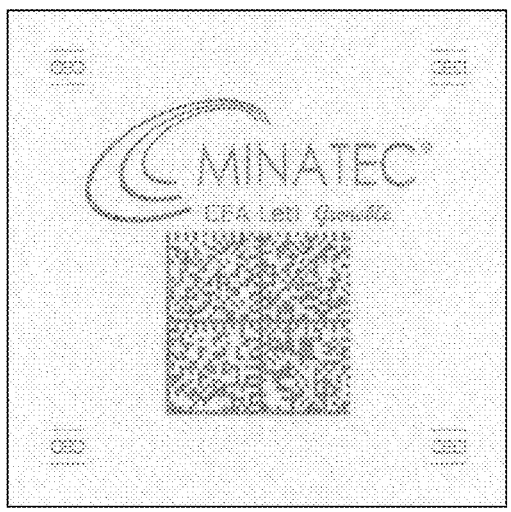
Figure 12D:
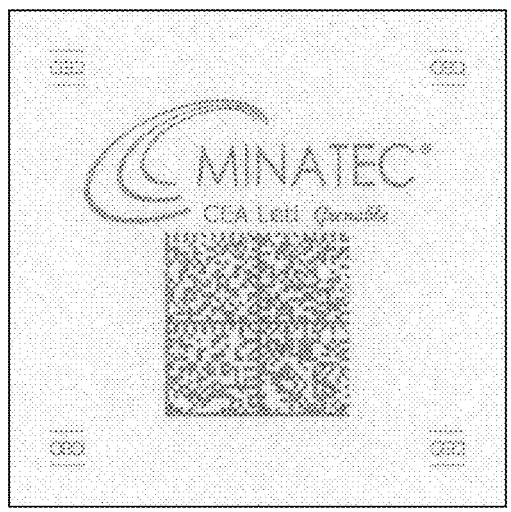

FIG. 12A illustrates an example of a source image of hologram IMAGE_H. FIGS. 12B, 12C, and 12D illustrate simulation results obtained based on a read device such as that in FIG. 3 on a halftone image obtained by the method of FIG. 6.

More specifically, FIG. 12B illustrates the reading from an image obtained by the method of FIG. 6 without carrying out a cycle of adjustment of the phase image of FIG. 11, FIG. 12C illustrates the reading from an image obtained by the method of FIG. 6 by carrying out the adjustment cycle of FIG. 11 three times, and FIG. 12D illustrates the reading from an image obtained by the method of FIG. 6 by repeating the adjustment cycle of FIG. 11 300 times.

In these drawings, it should be noted that the performing of the optimization method of FIG. 11 provides, even with a small number of cycles, an efficient corrective of the phase image applied to the final image, taking into account the initial loss of information of the amplitude of the Fourier transform of the source image of the hologram.

Indeed, the reading performed from an image obtained by the method of FIG. 6 after three iterations only of the cycle of FIG. 11 (FIG. 12C) is of very good quality, almost of same quality as the reading of FIG. 12D.

In the context of the above method, the quality of the grayscale image visualization is a desired advantage.

Figure 13:
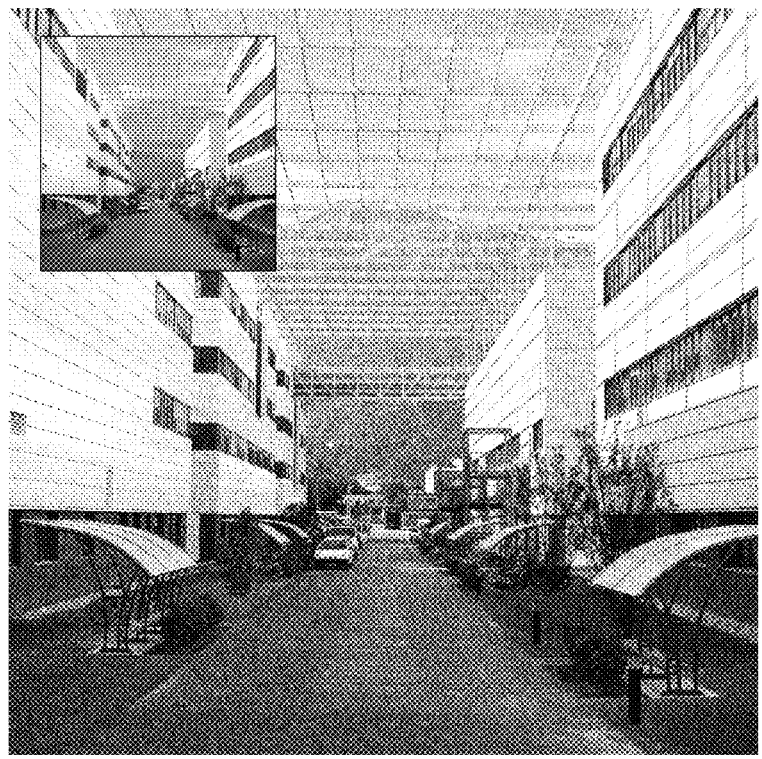
FIG. 13 illustrates a result of the method according to an embodiment.

FIG. 13 illustrates the result obtained from an image shown as an insert, at a screen resolution which shows the raster (the central areas of the pixels having an aspect ratio $\rho=1.5$). The gray appearance quality is quite satisfactory when the image is observed at a sufficient distance, the distance of the image introducing a visual blurring which smoothes out the halftone effect.

Figure 14A:
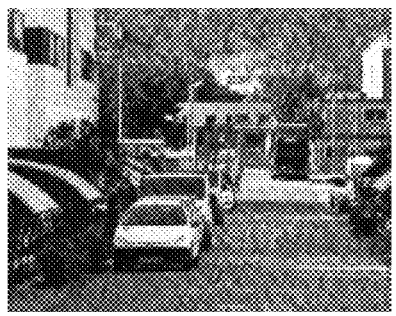
FIGS. 14A to 14D illustrate results obtained by carrying out variations of a method according to an embodiment.
Figure 14B:
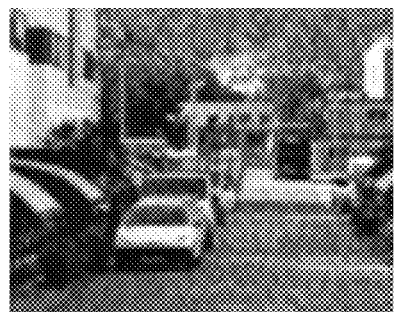

To simulate this blurred effect, it has been tried to artificially blur the image with a Gaussian blurring of a width of 2 and of 4 pixels. FIGS. 14A and 14B show the obtained results, FIG. 14D illustrating the initial image from which the images of FIGS. 14A and 14B originate: a granularity appears on the image, which is due to certain displacement conjunctions of the halftone patterns.

As previously discussed, the position of the halftone patterns is defined by the value of the phase assigned to the pixel. If two successive pixels have significantly different phase values, the distance between patterns will also be significant. According to whether the halftone background is light or dark, this difference will translate as the appearing of a white or black dot.

Figure 15:
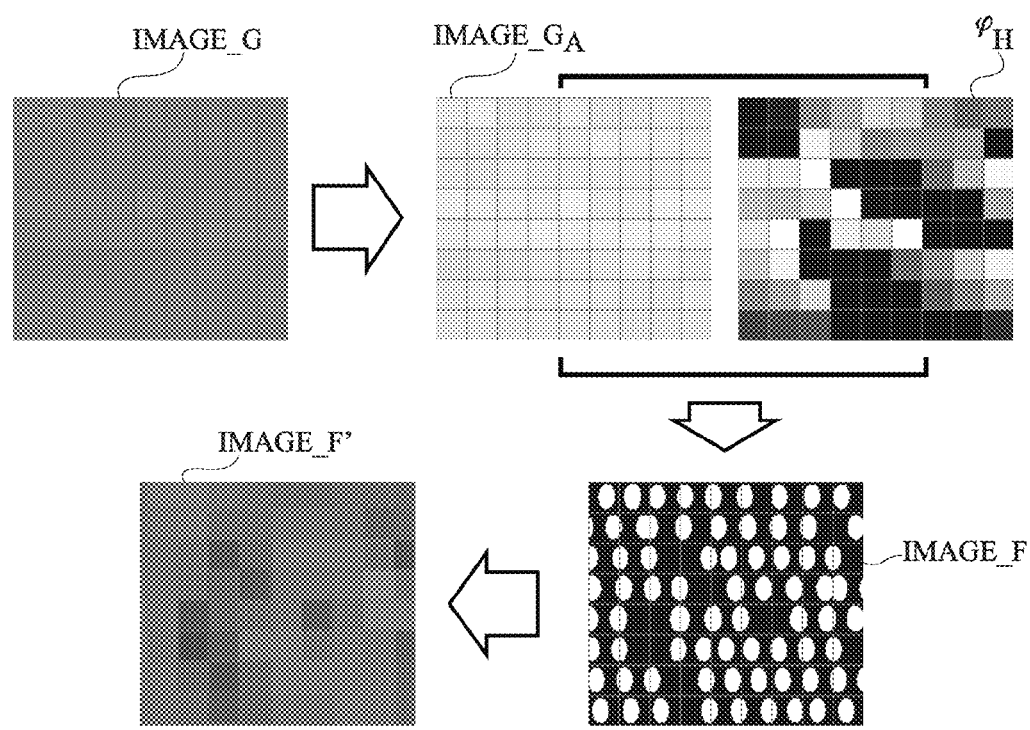
FIG. 15 illustrates a variation of a method according to an embodiment.

FIG. 15 shows a detail of grayscale image IMAGE_G based on which images IMAGE_$G_A$ and $\phi_H$ are calculated. These values enable to calculate the distribution of the patterns shown in image IMAGE_F. It can be seen that at locations where the phase switches from a maximum value (white pixel of $\phi_H$) to a minimum value (black pixel of $\phi_H$) an opposite off-centering of the two patterns, which results in the appearing of a "vacuum", is obtained. After the Gaussian blurring operation, this vacuum translates as the appearing of dark pixels on the resulting image (IMAGE_F').

This phenomenon is disturbing if the detection of the reconstructed image must be strictly identical to the original. Such is generally the case in data preservation.

This effect can however be decreased. To achieve this, the following methods can be mentioned:
- after simulation of the write and detection effect, the source image is modified to anticipate the opacifying and the lightening of certain pixels;
- a modification of the amplitude is directly introduced into the phase calculation loop to take into account the present of phase shifts;
- source image IMAGE_G is oversampled to increase the blurring with no image resolution loss.

Figure 14C:
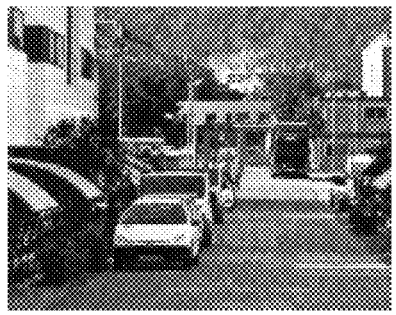
Figure 14D:
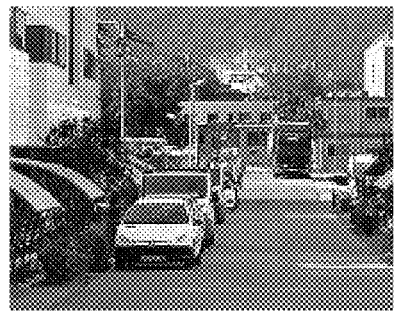

The result of this last proposition is illustrated in FIG. 14C, on an image oversampled by a factor 2, while keeping a 2-pixel image blurring. The improvement over the grayscale appearance can be clearly observed.

Figures 16A, 16B, 16C:
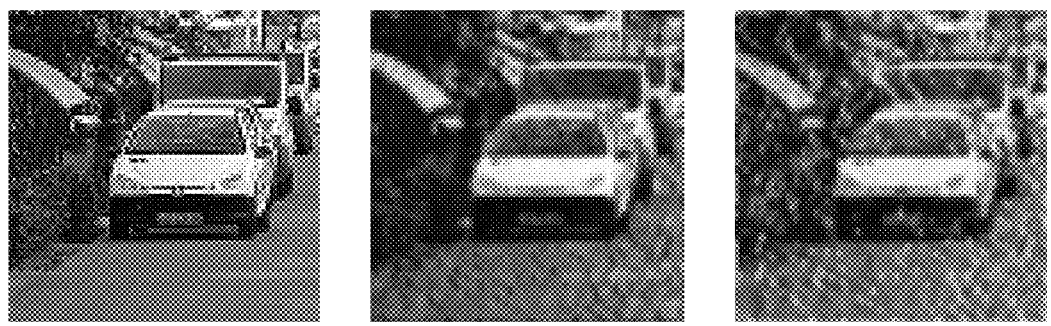
FIGS. 16A to 16C illustrate results obtained by carrying out variations of a method according to an embodiment.

FIGS. 16B and 16C illustrate the result of a blurring on a halftone image as provided hereabove, and by prior art techniques, the initial image being illustrated in FIG. 16A. In the case of prior art, the absence of dark and light cells as in the present case causes defects of a single shade, the light one in the present example. Such defects are thus particularly visible when they appear on the background of opposite shade (FIGS. 16B and 16C). The method provided herein solves this problem.

Many applications of the above method can be envisaged.

A first application relates to the analog storing of images. The provided solution allows a perennial preservation of graphic data due to a visual saving mode. The data recovery is performed with no digital decoding and does not risk the obsolescence of the read format.

This solution has the disadvantage of having a relatively long data recovery mode; a solution would thus be to keep the durability of the analog storage while using the rapidity of digital data recovery.

Take the example of an image of 1,000×1,000 pixels, coded over 256 gray levels (1 byte). Its digital weight, at the uncompressed bitmap format, is approximately $10^3$ ko.

The idea is to code a digital version of the source image of the hologram IMAGE_H. To make the detection easier, a binary representation of the source image of the hologram IMAGE_H is selected, assuming that only 50% of the hologram surface area is exploitable. This restriction is due to the difficulty of obtaining non-noisy images in coherent optics. This results in a bit storage capacity corresponding to 50% of the number of pixels. A digital capacity of approximately 62 ko is obtained. This decrease of the file size may be obtained by storing a compressed image of original image IMAGE_G, for example in jpeg format.

The user can thus have the choice between a fast digital detection of digital images in a compressed format and a slow analog detection of source files in the native format.

It should be noted that the detection of the image in compressed format may also be used to improve the quality of the reconstructed source image, by especially helping to correct the granularity effect.

Figure 17A:
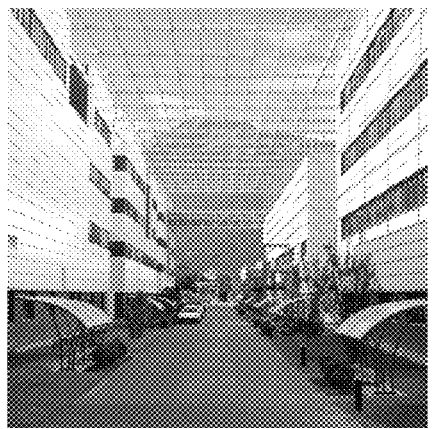
FIGS. 17A to 17D, 18, and 19 illustrate applications of a method according to an embodiment.
Figure 17C:
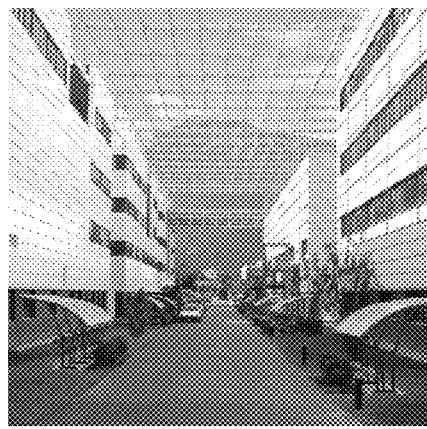
Figure 17B:
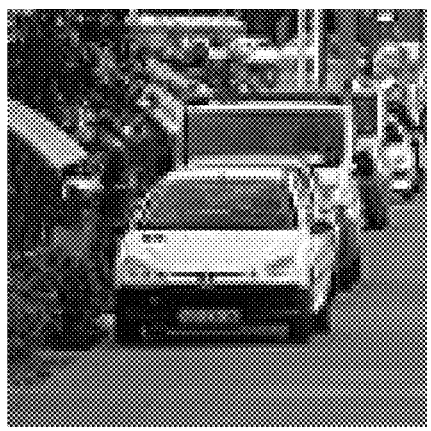
Figure 17D:
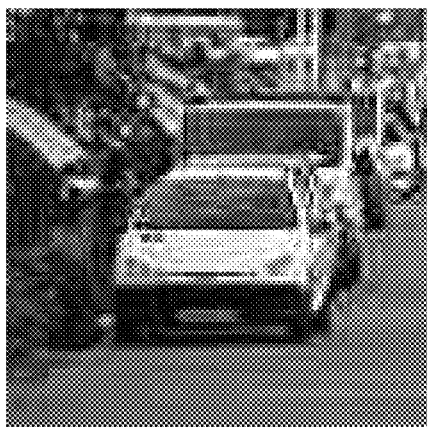

FIGS. 17A to 17D illustrates two examples of images IMAGE_G according to this principle, in full view for FIGS. 17A and 17C, and in enlarged view for FIGS. 17B and 17D. More specifically, FIGS. 17A and 17B illustrate an image in bitmap format having a 1,000-ko size and an image in jpeg format having a 62-ko size.

In the same field of application, a variation may also be provided to increase the surface area capacity of the analog storage medium.

In addition to the analog data, the storage medium must be able to preserve the metadata associated with visual documents. Such data are contained in the digital file background and may concern all forms of information (file name, creation date, file format, comments, etc.). Such information may be visualized in binary format (character sequence) and may accept some quality loss (form is second to content). This type of data thus effectively applies to synthetic holography storage.

Figure 18:
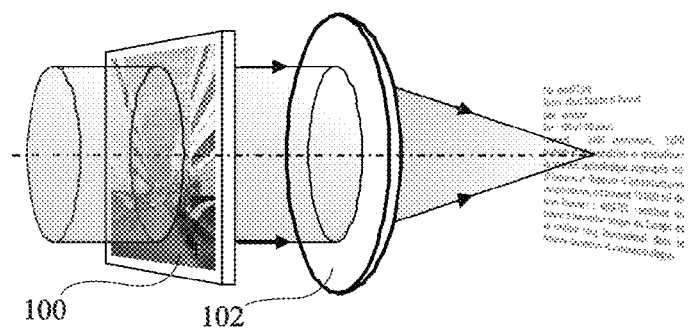

FIG. 18 shows this application. A laser beam crosses the halftone representation of the image, formed on a support 100, having a grayscale visual appearance. Behind a Fourier lens 102, the associated metadata 104 are visible. Such metadata are visually accessible by means of a laser and optics of simple design. Advantageously, the access to their content does not depend on a digital decoding format.

Redigitizing the analog data being a long process, the halftone representation of image IMAGE_G must be imaged on an array sensor to restore the original grayscale pixel matrix. This process is carried out by a succession of image shots which then have to be put together. If the image has few details, the putting together may be complicated.

Figure 19:
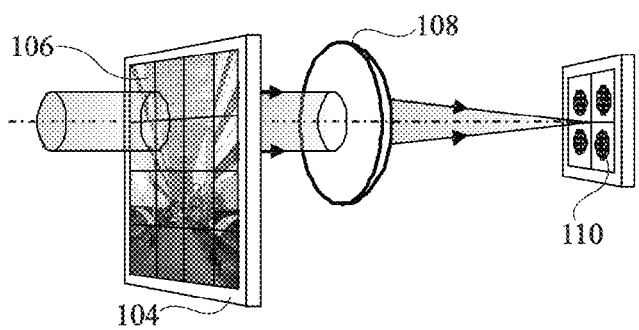

A solution may be to arrange alignment holograms within the image, as shown in FIG. 19.

Halftone representation 104 exhibits a series of holograms 106. Each hologram 106 forms in the focal plane of a Fourier lens 108 a light spot 110 at a specific coordinate. If the probe beam is at the exact crossing of four holograms, four different light spots 110 are detected in the read plane. The positioning on the optical axis of the plate having the holograms formed thereon can thus be controlled by the detection of these light spots. The system can scan the image by positioning itself at specific locations, for which the intensity of the four spots is balanced, independently from the visual content of the image.

Another application of the method provided herein, which is no longer within the context of analog storage, is the security of ID documents, and more generally of any type of documents. It can be envisaged to code in the ID photograph a hologram enabling to guarantee that the document is authentic.

Specific embodiments of the present invention have been described. Various alterations, modifications, and improvements will readily occur to those skilled in the art. In particular, other applications of the integration of a coded-aperture hologram in a halftone image having a grayscale appearance may be provided. Further, it should be noted that known hologram scrambling methods, implying the impossibility of a direct reading of the hologram, may be provided in combination with the method described herein. In this case, the use of a phase key or of a read mask may be provided on reading of the hologram, for example, with a read device such as that in FIG. 3.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for integrating a synthetic hologram in a directly observable image of a scene, comprising the steps of:
    defining a first source image of said scene, comprising grayscale pixels;
    forming first and second pixel matrixes from the first source image, the first matrix comprising pixels of a first and of a second shade according to whether a corresponding pixel of the first source image has a gray level greater than or smaller than a gray level threshold, each element of the second matrix comprising a value equal to a gray level difference between the corresponding pixel of the first source image and a corresponding pixel of the first matrix;
    forming a third pixel matrix by calculating a phase image of a synthetic hologram obtained by a Fourier transform of an image originating from a second source image of the hologram;
    forming a fourth pixel matrix, each pixel of the fourth matrix comprising an area internal to the pixel having its surface area determined based on a value of a corresponding pixel of the second matrix and off-centered in the pixel according to a value of a corresponding pixel of the third matrix; and
    performing a lithography of an opaque layer at the surface of a wafer according to a pattern defined by the fourth pixel matrix, the pattern comprising the value of the corresponding pixel of the second matrix and the value of the corresponding pixel of the third matrix, the lithography being provided to remove, from a pixel, the opaque layer inside of the internal area if the equivalent pixel of the first matrix is of the first shade and to remove the opaque layer outside of the central internal area if the equivalent pixel of the first matrix is of the second shade.

2. The method of claim 1, wherein the size of the internal area of each of the pixels of the fourth matrix is calculated from a value of a corresponding pixel of a fifth pixel matrix, each pixel of the fifth matrix being obtained by calculation of a diffracted amplitude of a wave through an aperture defined in the pixel, a ratio of the aperture surface area to the pixel surface area being equal to a value of a corresponding element of the second matrix.

3. The method of claim 2, wherein an amplitude $A^h_{nm}$, of a pixel of the fifth matrix depends on an intensity $I_{nm}$ of a corresponding element of the second matrix according to the following relation:

$$A^h_{nm} = \sqrt{\frac{I_{nm}}{2}} \cdot J_1\left(\sqrt{8I_{nm}}\right)$$

$J_1$ being the first Bessel function.

4. The method of claim 2, wherein the third matrix is obtained by carrying out the steps of:
    (a) calculating a sixth amplitude matrix obtained from the second source image of the hologram by carrying out the same steps as those enabling to obtain the fifth matrix from the second matrix;
    (b) combining the pixels of the sixth amplitude matrix with a random phase distribution or with a continuous phase component to obtain a complex value; and
    (c) calculating the phase image of the Fourier transform of said complex value.

5. The method of claim 2, wherein the third matrix is obtained by an optimization method taking advantage of the fifth matrix.

6. The method of claim 5, wherein the optimization method comprises:
    (a) calculating a sixth amplitude matrix obtained from the second source image of the hologram by carrying out the same steps as those enabling to obtain the fifth matrix from the second matrix;
    (b) combining the pixels of the sixth amplitude matrix with a random phase distribution or with a continuous phase component to obtain a first complex value;
    (c) calculating the Fourier transform of the first complex value;

(d) combining the pixels of the sixth pixel matrix with the pixels of the phase image resulting from the Fourier transform of step (c) to obtain a second complex value;
(e) calculating the inverse Fourier transform of the second complex value;
(f) combining the pixels of the sixth amplitude matrix with the pixels of the phase image resulting from the calculation of step (e) to obtain a new first complex value;
(g) repeating step (c) to calculate the Fourier transform of the new first complex value, the third matrix corresponding to the phase image obtained from this last Fourier transform.

7. The method of claim 6, wherein the optimization method further comprises the repeating of steps (d) to (g), the third matrix corresponding to the phase image obtained at step (g) after several cycles of repeating of steps (d) to (g).

8. The method of claim 7, wherein at least three cycles are carried out.

9. The method of claim 1, wherein the off-centering of the internal area of each pixel of the fourth matrix is directly proportional to the value of the corresponding pixel of the third matrix.

10. The method of claim 1, wherein the gray level threshold is equal to 0.5, to within 10%, on a normalized grayscale.

11. The method of claim 1, wherein the internal area of each pixel of the fourth matrix is elliptic.

12. The method of claim 11, wherein the aspect ratio of the elliptic internal area of each pixel of the fourth matrix is equal to $\pi/2$.

13. The method of claim 1, wherein the first shade of the first matrix is a minimum shade, the second shade of the first matrix is a maximum shade, the lithography being provided to remove the opaque layer inside of the internal area of a pixel if the equivalent pixel of the first matrix has the first shade and to remove the opaque layer outside of the internal area of a pixel if the equivalent pixel of the first matrix has the second shade.

14. The method of claim 1, wherein a minimum size of the internal area of each pixel of the fourth matrix is imposed.

15. The method of claim 14, wherein the minimum size of the internal area of the pixels of the fourth matrix corresponds to a gray level of 0.02 for dark pixel shades and of 0.98 for light pixel shades, on a normalized grayscale.

* * * * *